United States Patent
Oshiba et al.

(10) Patent No.: US 9,703,218 B2
(45) Date of Patent: Jul. 11, 2017

(54) TONER FOR DEVELOPING ELECTROSTATIC LATENT IMAGES

(71) Applicant: Konica Minolta, Inc., Tokyo (JP)

(72) Inventors: Tomomi Oshiba, Hachioji (JP); Ken Ohmura, Hachioji (JP); Kaori Matsushima, Hino (JP); Noboru Ueda, Tokyo (JP); Ito Koga, Hino (JP); Noriyuki Kimpara, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 16 days.

(21) Appl. No.: 14/504,827

(22) Filed: Oct. 2, 2014

(65) Prior Publication Data
US 2015/0099223 A1 Apr. 9, 2015

(30) Foreign Application Priority Data
Oct. 4, 2013 (JP) ................. 2013-209419

(51) Int. Cl.
*G03G 9/00* (2006.01)
*G03G 9/13* (2006.01)
*G03G 9/087* (2006.01)
*C08G 63/16* (2006.01)
*C08L 67/02* (2006.01)

(52) U.S. Cl.
CPC ......... *G03G 9/08755* (2013.01); *C08G 63/16* (2013.01); *C08L 67/02* (2013.01); *G03G 9/08795* (2013.01); *G03G 9/08797* (2013.01)

(58) Field of Classification Search
CPC .......... G03G 9/08755; G03G 9/08797; G03G 9/08795; C08L 67/02; C08G 63/16

USPC .......................................... 430/109.1, 109.4
See application file for complete search history.

(56) References Cited

FOREIGN PATENT DOCUMENTS

| JP | 2007-147927 | 6/2007 |
|----|-------------|--------|
| JP | 2012-008529 A | 1/2012 |
| JP | 2012-063559 A | 3/2012 |
| JP | 2013-156489 | 8/2013 |

OTHER PUBLICATIONS

Japanese Machine translation of JP2007-147927.*
Office Action dated Sep. 29, 2015 issued from the corresponding Japanese Patent Application No. 2031-209419.
English translation of Office Action dated Sep. 29, 2015 issued from the corresponding Japanese Patent Application No. 2031-209419.
Decision of Refusal; Patent Application No. 2013-209419; Drafting Date: Jan. 4, 2016; Applicant: Konica Minolta Co., Ltd.; total of 3 pages; English translation of Notification of Reasons for Refusal; total of 3 pages; Grand Total of 6 pages.

* cited by examiner

*Primary Examiner* — Thorl Chea
(74) *Attorney, Agent, or Firm* — Lucas & Mercanti, LLP

(57) ABSTRACT

A toner for developing electrostatic images contains a first resin and a second resin. The first resin is a crystalline polyester resin composed of a dicarboxylic acid unit and a dialcohol unit. The first resin has a weight average molecular weight of 5000 to 100000. The second resin has a weight average molecular weight of 5000 to 60000. The second resin is a polyester resin composed of a crystalline segment and an amorphous segment. The crystalline segment has a weight average molecular weight of 200 to 3000 and is composed of a dicarboxylic acid unit and a dialcohol unit. In the toner, a specific carbon number relationship is present between each unit.

11 Claims, No Drawings

TONER FOR DEVELOPING ELECTROSTATIC LATENT IMAGES

CROSS-REFERENCE TO RELATED APPLICATION

This application is based on Japanese Patent Application No. 2013-209419 filed on Oct. 4, 2013, the contents of which are incorporated herein by reference.

BACKGROUND

1. Technical Field

The present invention relates to a toner for developing electrostatic latent images.

2. Description of Related Art

Recently, since an image forming device of an electrophotographic type can be used not only for document printing or simple copying in an office as a general copying machine or a printer but also in the field of producing a printed matter which is used outside the office, specifically, for simple printing of variable information from electronic data, its application area is being broadened even to an on-demand-printing (POD) market, which belongs to an area of simple printing. Thus, in-office power consumption increases as it becomes common in the office where several copying machines or printers are placed.

In the POD market, it is required for the printed matter, not copying action, to have a value. As such, it is required to form a printed matter with high image quality.

In order to obtain a printed matter with high image quality, it is known that reducing particle size of a toner is effective, and various kinds of so-called chemical toners have been suggested in order to achieve it. The chemical toner is related to a method of granulating in an aqueous medium or the like, and thus unlike a pulverization method, it has an advantage that toner particles in a small particle size can be obtained with high homogeneity.

Further, in order to reduce power consumption, increase printing speed, or increase types of an applicable paper, a so-called low temperature fixing technique by which toner images are fixed at a lower temperature than that of a conventional case has been focused.

In response to a demand for such low temperature fixing, various studies have been made. As a technique for achieving the low temperature fixing, a technique for incorporating a crystalline polyester resin into a toner is known.

For example, in Japanese Patent Application Laid-Open No. 2012-8529 (US 2011294062 A1), the inventions that are related to a binder resin consisting of a crystalline resin containing a predetermined polycondensation resin component and a predetermined styrene resin component and an amorphous resin containing a predetermined polyester, and a toner containing a colorant are described.

Further, in Japanese Patent Application Laid-Open No. 2012-63559, the invention that is related to a toner containing crystalline polyester with controlled SP value, dispersant for crystalline polyester, first amorphous polyester, and second amorphous polyester or modified polyester derived from the second amorphous polyester, and also a releasing agent and a colorant is described.

SUMMARY

By introducing the crystalline polyester, as a partial structure, into the binding resin itself, the toner described in Japanese Patent Application Laid-Open No. 2012-8529 achieves constant low temperature fixability. However, function of the crystalline polyester is not fully exhibited when crystalline polyester is introduced to the binding resin, and thus it was found that in some cases, the desired low temperature fixability may not be obtained.

Further, according to the toner described in Japanese Patent Application Laid-Open No. 2012-63559, the constant low temperature fixability is obtained by dispersing crystalline polyester along with predetermined dispersant in amorphous polyester (that is, first amorphous polyester). However, even for a case in which dispersant is used, it was found that, under an environment to which the toner may be exposed, the desired heat resistance storability may not be obtained due to fusion of crystalline polyester or bleed out from amorphous polyester.

Accordingly, an object of the present invention is to provide a toner for developing electrostatic images having excellent low temperature fixability and heat resistance storability.

As a result of intensive studies, the present inventors found that, by introducing a crystalline polyester segment into a binder resin and also dispersing crystalline polyester in the binder resin by using it, the aforementioned problem can be solved, and they completed the present invention accordingly.

Specifically, to achieve at least one of the purposes described above, provided is as follows:

1. A toner for developing electrostatic images containing at least a first resin and a second resin, the toner being characterized in that the first resin is a crystalline polyester resin consisting of a dicarboxylic acid unit and a dialcohol unit, the carbon number (1a) of the dicarboxylic acid unit in the first resin and the carbon number (1b) of the dialcohol unit in the first resin have the relationships of $4 \leq 1a \leq 12$ and $2 \leq 1b \leq 12$, the second resin is a polyester resin consisting of a crystalline segment and an amorphous segment, the crystalline segment of the second resin is a crystalline polyester segment consisting of a dicarboxylic acid unit and a dialcohol unit, the carbon number (2a) of the dicarboxylic acid unit and the carbon number (2b) of the dialcohol unit in the crystalline polyester segment of the second resin have the relationships of $4 \leq 2a \leq 12$ and $2 \leq 2b \leq 12$ and also satisfy the relationships of $0 \leq |1a-2a| \leq 2$ and $0 \leq |1b-2b| \leq 2$, the weight average molecular weight of the first resin is 5000 to 100000, the weight average molecular weight of the second resin is 5000 to 60000, and the weight average molecular weight of the crystalline segment in the second resin is 200 to 3000, is provided.

Further, 2. the toner for developing electrostatic images described in above 1, the toner being characterized in that the weight average molecular weight of the first resin is 10000 to 50000, the weight average molecular weight of the second resin is 10000 to 50000, and the weight average molecular weight of the crystalline segment in the second resin is 500 to 3000, is preferable.

Further, the toner for developing electrostatic images described in above 1 or 2, in which the melting point (Tm) of the first resin is equal to or higher than 40° C. but lower than 90° C., is preferable.

DETAILED DESCRIPTION

Hereinbelow, the embodiments for carrying out the present invention will be described in detail. However, the present invention is not limited to the following embodiments. Further, the description, "X to Y" indicating a range in the present invention means "not less than X but not more than Y". Further, unless specifically described otherwise, the operation, the measurement of physical properties, or the like are performed under the conditions, that is, room temperature of (20 to 25° C.)/relative humidity of 40 to 50%.

<Toner for Developing Electrostatic Images>

Provided is a toner for developing electrostatic images containing at least a first resin and a second resin (in the present specification, it may be simply referred to as "toner").

In that case, it is characterized in that the first resin is a crystalline polyester resin consisting of a dicarboxylic acid unit and a dialcohol unit, the carbon number (1a) of the dicarboxylic acid unit in the first resin and the carbon number (1b) of the dialcohol unit in the first resin have a relationship of $4 \leq 1a \leq 12$ and $2 \leq 1b \leq 12$, the second resin is a polyester resin consisting of a crystalline segment and an amorphous segment, the crystalline segment of the second resin is a crystalline polyester segment consisting of a dicarboxylic acid unit and a dialcohol unit, the carbon number (2a) of the dicarboxylic acid unit and the carbon number (2b) of the dialcohol unit in the crystalline polyester segment of the second resin have a relationship of $4 \leq 2a \leq 12$ and $2 \leq 2b \leq 12$ and also satisfy the relationship of $0 \leq |1a-2a| \leq 2$ and $0 \leq |1b-2b| \leq 2$. It is also characterized in that the weight average molecular weight of the first resin is 5000 to 100000, the weight average molecular weight of the second resin is 5000 to 60000, and the weight average molecular weight of the crystalline segment in the second resin is 200 to 3000.

As described above, with a toner for developing electrostatic images of a related art, there are cases in which the desired low temperature fixability and heat resistance storability are not obtained.

Specifically, as described in Patent Document 1, the toner having crystalline polyester introduced as a partial structure to a binder resin itself has limited movement of the crystalline polyester moiety during toner fixing. As a result, there are cases in which, as the function such as deformation of a toner by crystalline polyester cannot be fully exhibited, the desired low temperature fixability may not be obtained.

Further, as described in Patent Document 2, with the toner having a crystalline polyester resin dispersed inside a binder resin, the function such as deformation of a toner by crystalline polyester is exhibited during toner fixing so that the low temperature fixability can be obtained, unlike the cases of Patent Document 1.

However, for the toner of such types, there are cases in which when the compatibility of the amorphous resin composed mainly of a binder resin and the crystalline polyester resin is low, the crystalline polyester resin may bleed out or be released from the inside of the binder resin. Accordingly, the crystalline polyester resin migrating to the surface or outside of the toner may be fused to each other under an environment to which the toner may be exposed, for example, an environment of 50 to 60° C. during transport and storage. As a result, deterioration of the toner is caused. Meanwhile, since the crystalline polyester resin migrating to the surface or outside of the toner has low strength, contamination of a member which may come in contact with the toner of a copying machine can be caused at the time of using such toner.

Meanwhile, according to the case described above, when the compatibility of the amorphous resin composed mainly of a binder resin and the crystalline polyester resin is high, the compatibility of the amorphous resin and crystalline resin may be exhibited under an environment to which the toner may be exposed. Then, the glass transition temperature of the toner as a whole may be lowered. As a result, the deterioration of the toner is caused.

Thus, the toner having a crystalline polyester resin dispersed inside a binder resin as described in Patent Document 2 has low heat resistance storability in both cases, that is, when the crystalline polyester resin has high compatibility with an amorphous resin consisting of a binder resin or when the resin has low compatibility with it. Meanwhile, such tendency is more prominent when a crystalline polyester resin, which consists of carboxylic acid with low carbon number and alcohol with low carbon number capable of plasticizing toner due to rapid melting during thermal fixing, is used.

Under the circumstances described above, achieving excellent low temperature fixability and achieving excellent heat resistance storability are in trade-off relationship, and thus it was difficult to have both.

Meanwhile, the toner according to the embodiment of the present invention contains at least a first resin, which is a crystalline polyester resin, and a second resin, which is a polyester resin having a crystalline polyester segment.

In that case, because the first resin is not introduced to the second resin, it can fully exhibit the function such as toner deformation, and thus the low temperature fixability can be preferably achieved.

In addition, because the first resin is a crystalline polyester resin which consists of a dicarboxylic acid unit with a low carbon number and a dialcohol unit with a low carbon number, it rapidly melts during thermal fixing and can plasticize the toner, and thus excellent low temperature fixability can be exhibited.

Meanwhile, as the crystalline polyester segment having the same chemical structure as the crystalline polyester resin is introduced into the second resin, based on interaction by intermolecular force, at least part of the crystalline polyester segment of the second resin and at least part of the first resin can preferably maintain the dispersed first resin.

In particular, the crystalline polyester segment of the second resin has a certain chemical structure to maintain the dispersion. Specifically, the crystalline polyester segment of the second resin consists of a dicarboxylic acid unit and a dialcohol unit which have the same carbon number as the first resin. Further, from the viewpoint of causing preferably an interaction between at least part of the crystalline polyester segment of the second resin and at least part of the first resin, the chemical structure of the crystalline polyester segment of the second resin is adjusted such that the absolute value of the difference in carbon number between the dicarboxylic acid unit and the dialcohol unit of the first resin and the dicarboxylic acid unit and the dicarboxylic acid unit of the crystalline polyester segment in the second resin is within a predetermined range (depending on the chemical structure of the crystalline polyester segment of the second resin, it is also possible that the chemical structure of the first resin is adjusted). In addition, by setting the crystalline polyester segment of the second resin to have the weight average molecular weight of 200 to 3000, the intermolecular force required for maintaining the dispersion of the first resin is surely obtained.

As described above, by having the first resin with a predetermined structure and having the second resin with a predetermined structure that is capable of maintaining dispersion of the first resin, bleed out or release of the first resin and also compatibility with the second resin are prevented, and thus excellent heat resistance storability can be achieved.

In addition, considering the performance of toner, for example, low temperature fixability, heat resistance storability, release property, or the like, the weight average molecular weight of the first resin and the weight average molecular weight of the second resin are limited to certain values.

As described above, by having a certain structure for the first resin and the second resin, both the low temperature fixability and heat resistance storability can be obtained simultaneously.

As described above, a toner for developing electrostatic images having excellent low temperature fixability and heat resistance storability can be provided.

Meanwhile, the aforementioned mechanism is pure assumption, and even when the effect is exhibited based on other mechanisms, it is still included in the technical scope of the present invention. Specifically, examples include that the crystalline polyester segment introduced to the second resin contributes to the low temperature fixability, or the like.

[First Resin]

The first resin is a crystalline polyester resin consisting of a dicarboxylic acid unit and a dialcohol unit.

By having the first resin in the toner for developing electrostatic images, the low temperature fixability can be preferably achieved.

Meanwhile, as described herein, "crystalline" means that, in differential scanning calorimetry (DSC), a distinct heat absorption peak is exhibited instead of a stepped heat absorption change. Herein, the distinct heat absorption peak specifically indicates a peak with the half width value of less than 15° C. for the heat absorption peak when the measurement is made at a temperature increase rate of 10° C./min according to the differential scanning calorimetry (DSC) described in Examples.

(Dicarboxylic Acid Unit of First Resin)

The dicarboxylic acid unit of the first resin is derived from aliphatic dicarboxylic acid which has the carbon number (1a) satisfying the relationship of $4 \leq 1a \leq 12$.

Examples of the aliphatic dicarboxylic acid include linear dicarboxylic acid and branched dicarboxylic acid. Specific examples of the aliphatic dicarboxylic acid include succinic acid, glutaric acid, adipic acid, pimellic acid, suberic acid, azelaic acid, sebacic acid, 1,9-nonane dicarboxylic acid, 1,10-decane carboxylic acid, 1,10-dodence carboxylic acid (1,10-dodecane diacid), 2-methylpropane-1,3-dicarboxylic acid, and 2-ethylbutane-1,4-dicarboxylic acid. Further, lower alkyl ester or acid anhydride of them can be also used. Among them, from the viewpoint of having improved crystallinity, linear dicarboxylic acid is preferably used. It is more preferable to use succinic acid, adipic acid, suberic acid, sebacic acid, or 1,10-dodecane diacid.

(Dialcohol Unit of First Resin)

The dialcohol unit of the first resin is derived from aliphatic dialcohol which has the carbon number (1b) satisfying the relationship of $2 \leq 1b \leq 12$.

Examples of the aliphatic dialcohol may include either linear dialcohol or branched dialcohol. Specific examples of the aliphatic dialcohol include ethylene glycol, 1,3-propane diol, 1,4-butane diol, 1,5-pentane diol, 1,6-hexane diol, 1,7-heptane diol, 1,8-octane diol, 1,9-nonane diol, 1,10-dodecane diol, 1,11-undecane diol, 1,12-dodecane diol, 2-methylpropane-1,3-diol, 2-ethylhexane-1,6-diol, and 1,3-butane diol. Among them, from the viewpoint of having improved crystallinity, linear dialcohol is preferably used. It is more preferable to use ethylene glycol, 1,4-butane diol, 1,6-hexane diol, 1,9-nonane diol, or 1,12-dodecane diol.

The first resin can be obtained by polycondensation between the aforementioned dicarboxylic acid and dialcohol. The first resin consisting of a dicarboxylic acid unit with a low carbon number and a dialcohol unit with a low carbon number can rapidly melt during thermal fixing and plasticize the toner, and thus the toner to be obtained can exhibit excellent low temperature fixability.

The weight average molecular weight of the first resin is 5000 to 100000, and preferably 10000 to 50000. By having the weight average molecular weight within the range, the toner for developing electrostatic images can have excellent low temperature fixability and heat resistance storability. Meanwhile, with regard to "the weight average molecular weight" value described in the specification, a value measured by gel permeation chromatography (GPC) is used. Specifically, the value measured by the method of the Examples is used.

The melting point (Tm) of the first resin is preferably equal to or higher than 40° C. but lower than 90° C., and more preferably equal to or higher than 55° C. but lower than 80° C. By having the melting point of the first resin in the above range, the low temperature fixability and heat resistance storability are suitably obtained, and therefore are preferable. Meanwhile, with regard to the "melting point (Tm)" described herein, the heat absorption peak temperature measured by the method of the Examples is used.

The acid value (AV) of the first resin is preferably 5 to 70 mg KOH/g.

A content of the first resin is preferably 1 to 40 parts by mass, and more preferably 5 to 20 parts by mass relative to the entire toner. When the content of the first resin is 40 parts by mass or less, burial or filming of an external additive is small, and thus preferable. Further, when the content of the first resin is 1 part by mass or more, the effect of the improved low temperature fixability is effectively obtained, and thus preferable.

[Second Resin]

The second resin is a polyester resin consisting of a crystalline segment and an amorphous segment. The crystalline segment is a crystalline polyester segment consisting of a dicarboxylic acid unit and a dialcohol unit.

As the second resin has a crystalline segment, it can preferably disperse the first resin and the heat resistance storability can be preferably obtained.

Since the second resin has an amorphous segment with non-crystalline property and a crystalline segment with crystalline property, it has chemical properties of both the crystalline resin and amorphous resin. Specifically, the compound has not only a distinct heat absorption peak but also a predetermined glass transition temperature (Tg) according to differential scanning calorimeter (DSC). Meanwhile, as described herein, "amorphous" means that, in differential scanning calorimetry (DSC), a stepped heat absorption change is exhibited instead of a distinct heat absorption peak.

The binding mode between the crystalline segment and amorphous segment is not particularly limited, and there is a binding mode like graft copolymer which is obtained by binding of an amorphous segment to an end of a crystalline segment. It is preferable that an amorphous segment bind to an end of a crystalline segment. In other words, it is preferable that the amorphous segment and crystalline segment form a block copolymer.

The weight average molecular weight of the second resin is 5000 to 60000, and preferably 10000 to 50000. By having the weight average molecular weight of the second resin within the range, excellent performance of the toner like low temperature fixability, heat resistance storability, and release property can be obtained.

(Amorphous Segment)

Although not particularly limited, the amorphous segment is amorphous polyester obtained by condensation of a polyvalent carboxylic acid component and a polyvalent alcohol component.

The polyvalent carboxylic acid component is not particularly limited, and examples of the divalent carboxylic acid component include aromatic carboxylic acid such as terephthalic acid, isophthalic acid, phthalic anhydride, trimellitic anhydride, pyromellitic acid, or naphthalene dicarboxylic acid; aliphatic carboxyl acid such as maleic anhydride, fumaric acid, succinic acid, alkenyl succinic acid, adipic acid, suberic acid, azelaic acid, sebacic acid, 1,9-nonane dicarboxylic acid, 1,10-decane dicarboxylic acid, 1,12-dodecane dicarboxylic acid, 1,14-tetradecane dicarboxylic acid, or 1,18-octadecane dicarboxylic acid; alicyclic carboxylic acids such as cyclohexane dicarboxylic acid; and lower alkyl ester and acid anhydride of those acids.

Further, alkenyl succinic acid or anhydride thereof can be also used. Examples of the alkenyl succinic acid include n-dodecyl succinic acid, n-dodecenyl succinic acid, isododecyl succinic acid, isododecenyl succinic acid, n-octyl succinic acid, n-octenyl succinic acid, and acid anhydride, acid chloride, and lower alkyl ester with 1 to 3 carbon atoms of those acids.

Further, tri- or more-valent carboxylic acid can be also used. Examples of tri- or more-valent carboxylic acid include trimellitic acid such as 1,2,4-benzene tricarboxylic acid or 1,2,5-benzene tricarboxylic acid, 1,2,4-naphthalene tricarboxylic acid, hemimellitic acid, trimesic acid, melophanic acid, prehnitic acid, pyromellitic acid, mellitic acid, 1,2,3,4-butane tetracarboxylic acid, and acid anhydride, acid chloride, and lower alkyl ester with 1 to 3 carbon atoms of those acids. Among them, trimellitic acid (anhydride) is particularly preferable.

Among them, from the viewpoint of obtainability or cost, it is preferable to use terephthalic acid, trimellitic anhydride, fumaric acid, dodecenyl succinic anhydride, adipic acid, or sebacic acid as a polyvalent carboxylic acid.

The aforementioned polyvalent carboxylic acid may be used either singly or in combination of two or more types.

The polyvalent alcohol component is not particularly limited, and examples of divalent alcohol component include aliphatic dialcohol such as ethylene glycol, 1,3-propane diol, 1,4-butane diol, 1,5-pentane diol, 1,6-hexane diol, 1,7-heptane diol, 1,8-octane diol, 1,9-nonane diol, 1,10-dodecane diol, 1,11-undecane diol, 1,12-dodecane diol, 1,13-tridecane diol, 1,14-tetradecane diol, 1,18-octadecane diol, or 1,20-eicosanioc acid diol; bisphenols such as bisphenol A or bisphenol F, and alkylene oxide adduct of bisphenols such as ethylene oxide adduct or propylene oxide adduct thereof. Further, examples of tri- or more-valent alcohol component include glycerol, trimethylol propane, pentaerythritol, and sorbitol. Further, from the viewpoint of production cost or an influence on an environment, cyclohexane dimethanol, cyclohexane diol, or neopentyl alcohol can be used. Further, unsaturated polyvalent alcohol such as 2-butyne-1,4-diol, 3-butyne-1,4-diol, or 9-octadecene-7,12-diol can be also used.

Among them, ethylene oxide adduct or propylene oxide adduct of bisphenol A is preferably used as a polyvalent alcohol component.

The aforementioned polyvalent alcohol component may be used either singly or in combination of two or more types.

Meanwhile, when at least one of the polyvalent carboxylic acid and polyvalent dialcohol includes tri- or more-valent compound, the polymer chain may have a cross-linked structure. By having a cross-linked structure, the decrease in the elasticity at high temperature side can be suppressed so that the off-set property at high temperature side can be improved.

The amorphous segment can be obtained by, for example, a polycondensation reaction between the polyvalent carboxylic acid and polyvalent alcohol that are described above. At that time, by controlling the polyvalent carboxylic acid and polyvalent alcohol that are used and conditions for polycondensation reaction, the physical properties can be controlled.

Further, in addition to the amorphous polyester described above, a styrene-acrylene resin or the like described in Japanese Patent Application Laid-Open No. 2011-197659 can be used as an amorphous segment.

A content of the amorphous segment is, relative to the second resin, preferably 50 to 95% by mass. When the content of the amorphous segment is 50% by mass or more, favorable toner particle strength is obtained, and thus preferable as being highly practical. Further, when it is 95% mass or less, preferred dispersibility of the first resin can be obtained, and thus desirable.

(Crystalline Segment)

The crystalline segment is a crystalline polyester segment consisting of a dicarboxylic acid unit and a dialcohol unit.

As the second resin has a crystalline segment, the first resin contained in the toner can be kept dispersed, or the like.

Dicarbon Unit in the Second Resin

The dicarboxylic acid unit of the second resin is derived from aliphatic dicarboxylic acid in which the carbon number (2a) satisfies the relationship of $4 \leq 2a \leq 12$.

Since the aliphatic dicarboxylic acid which can be used is the same as the aliphatic dicarboxylic acid described above for the first resin, no further explanation is given here.

The aliphatic dicarboxylic acid can be used either singly or in combination of two or more types.

Dialcohol Unit in the Second Resin

The dialcohol unit of the second resin is derived from aliphatic dialcohol in which the carbon number (2b) satisfies the relationship of $2 \leq 2b \leq 12$.

Since the aliphatic dialcohol which can be used is the same as the dialcohol in the first resin described above, no further explanation is given here.

The aliphatic dialcohol can be used either singly or in combination of two or more types.

The crystalline segment can be obtained by a polycondensation reaction between the dicarboxylic acid and dialcohol that are described above. Because the dicarboxylic acid unit and the dialcohol unit of the crystalline segment in the second resin have the same carbon number as the dicarboxylic acid unit and the dialcohol unit in the first resin, the first resin can be preferably kept dispersed by the crystalline segment of the second resin. The crystalline segment can also contribute to the constant low temperature fixability.

The use ratio of dicarboxylic acid and dialcohol for obtaining the crystalline segment of the second resin is preferably such that the equivalent ratio between the carboxy group [COOH] of the dicarboxylic acid component and the hydroxyl group [OH] of the dialcohol group, that is, [OH]/[COOH], is 1.2/1 to 1/1.2. From the viewpoint of a preferred reaction with an amorphous segment during the reaction for synthesizing the second resin, the use ratio between the dicarboxylic acid and dialcohol is preferably not 1. In other words, it is preferable that the crystalline segment be either dicarboxylic acid or dialcohol.

The weight average molecular weight of the crystalline segment is 200 to 3000, and preferably 500 to 3000. When the weight average molecular weight of the crystalline segment is within the range, favorable dispersibility of the first resin is obtained so that both the low temperature fixability and heat resistance storability can be obtained simultaneously.

The content of the crystalline segment is, relative to the second resin, preferably 5 to 50% by mass. When the content of the crystalline segment is 5% by mass or more, the dispersibility of the crystalline polyester can be favorably maintained, and thus preferable. Further, when the content of the crystalline segment is 50% by mass or less, favorable toner particle strength is obtained, and thus preferable as being highly practical.

[Crystalline Segment of First Resin and Second Resin]

According to this embodiment, it is preferable that a chemical structure allowing for a desirable interaction between the first resin and the second resin of the crystalline segment be selected. Accordingly, the first resin is kept dispersed within the second resin so that bleed out and release of the first resin, and compatibility of the first resin with the second resin are prevented. As a result, excellent heat resistance storability can be achieved.

Specifically, the carbon number (1a) of the dicarboxylic acid unit in the first resin and the carbon number (2a) of the dicarboxylic acid unit in the crystalline polyester segment of the second resin (that is, crystalline segment) preferably satisfy the relationship of $0 \leq |1a-2a| \leq 2$. It is more preferable that they satisfy the relationship of $|1a-2a|=0$.

It is preferable that the carbon number (1b) of the dialcohol unit in the first resin and the carbon number (2b) of the dialcohol unit in the crystalline polyester segment of the second resin (crystalline segment) satisfy the relationship of $0 \leq |1b-2b| \leq 2$. It is more preferable that they satisfy the relationship of $|1b-2b|=0$.

By satisfying the above relationship, it becomes easier for the first resin to have an interaction with the crystalline segment introduced to the second resin, which has the same structure as the first segment, and therefore good retention of the first resin by the second resin can be obtained.

[Amorphous Resin]

The toner for developing electrostatic images may additionally contain an amorphous resin. As described herein, the "amorphous resin" means a resin which does not exhibit any distinct melt peak during temperature increase for DSC measurement. As an amorphous resin, a resin used for a typical toner can be used. Examples thereof include a styrene acrylic resin, an amorphous polyester resin, and a polyol resin.

The weight average molecular weight of the amorphous resin is 5000 to 60000, and preferably 8000 to 30000. When the weight average molecular weight is within the range, the toner to be obtained has excellent blocking resistance and also the low temperature fixability can be obtained.

The glass transition temperature (Tg) of the amorphous resin is preferably 40 to 90° C., and more preferably 45 to 80° C.

The softening temperature of the amorphous resin is preferably 70 to 140° C., and more preferably 70 to 125° C.

According to a preferred embodiment, the amorphous resin can be used as a shell for coating a core made of toner microparticles of the first resin and the second resin.

[Releasing Agent (Wax)]

The toner for developing electrostatic images may additionally contain a releasing agent.

The releasing agent is not particularly limited, and any known ones can be used. Specific examples of the releasing agent include low molecular weight polyolefins such as polyethylene, polypropylene and polybutene, vegetable waxes such as synthetic ester wax, carnauba wax, rice wax, candelilla wax, Japan wax and jojoba oil; mineral or petroleum waxes such as montan wax, paraffin wax, microcrystalline wax and Fischer-Tropsch wax; and modified products thereof.

The addition amount of the releasing agent is, relative to the entire toner, preferably 0.5 to 25 parts by mass, and more preferably 3 to 15 parts by mass. When it is within the range, there is an effect of preventing hot off-set or ensuring the release property.

Further, dispersion diameter of the releasing agent in the toner is, although not particularly limited, preferably 10 to 1000 nm, more preferably 50 to 500 nm, and even more preferably 80 to 300 nm.

[Colorant]

The toner for developing electrostatic images may additionally contain a colorant.

As for the colorant, anyone of carbon black, a magnetic material, a dye, and a pigment can be used.

As for the carbon black, channel black, furnace black, acetylene black, thermal black, or lamp black is used.

As for the magnetic material, a ferromagnetic metal such as iron, nickel, or cobalt, an alloy containing those metals, a compound of ferromagnetic metal such as ferrite or magnetite, an alloy which does not contain a ferromagnetic metal but exhibits ferromagneticity by heat treatment, for example, an alloy referred to as Heusler alloy such as manganese-copper-aluminum or manganese-copper-tin, or chrome dioxide can be used.

As for the black colorant, carbon black such as furnace black, channel black, acetylene black, thermal black, or lamp black, and magnetic powder such as magnetite or ferrite are also used.

Examples of the magenta or red colorant include C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48; 1, C. I. Pigment Red 53; 1, C. I. Pigment Red 57; 1, C. I. Pigment Red 122, C. I. Pigment Red 123, C. I. Pigment Red 139, C. I. Pigment Red 144, C. I. Pigment Red 149, C. I. Pigment Red 150, C. I. Pigment Red 166, C. I. Pigment Red 177, C. I. Pigment Red 178, Pigment Red 184, and C. I. Pigment Red 222.

Examples of the orange or yellow colorant include C. I. Pigment Orange 31, C. I. Pigment Orange 43, C. I. Pigment Yellow 12, C. I. Pigment Yellow 13, C. I. Pigment Yellow 14, C. I. Pigment Yellow 15, C. I. Pigment Yellow 17, C. I. Pigment Yellow 74, C. I. Pigment Yellow 93, C. I. Pigment Yellow 94, C. I. Pigment Yellow 138, C. I. Pigment Yellow 155, C. I. Pigment Yellow 180, and C. I. Pigment Yellow 185.

Examples of the green or cyan colorant include C. I. Pigment Blue 15, C. I. Pigment Blue 15; 2, C. I. Pigment Blue 15; 3, C. I. Pigment Blue 15; 4, C. I. Pigment Blue 16, C. I. Pigment Blue 60, C. I. Pigment Blue 62, C. I. Pigment Blue 66, and C. I. Pigment Green 7.

The aforementioned colorant can be used either singly or in combination of two or more types.

An addition amount of the colorant is, relative to the entire toner, preferably 1 to 30% by mass, and more preferably 2 to 20% by mass. By having it within this range, color reproducibility of an image can be obtained.

[Charge Control Agent]

The toner for developing electrostatic images may additionally contain a charge control agent.

Various known compounds can be used as a charge control agent.

An addition amount of the charge control agent is, relative to 100 parts by mass of the second resin in the toner particle which is finally obtained, preferably 0.1 to 10 parts by mass, and more preferably 0.5 to 5 parts by mass.

[External Additive]

The toner for developing electrostatic images may additionally contain an external additive.

From the viewpoint of improving charging performances, fluidity, or cleaning property as a toner, known particles like inorganic microparticles and organic microparticles or a lubricating agent can be added as an external additive to the surface of toner particles.

Examples of the inorganic microparticles include inorganic microparticles such as silica, titania, alumina, or strontium titanate. If necessary, those inorganic microparticles may be hydrophobically treated.

As for the organic microparticles, spherical organic microparticles having a number average primary particle diameter of 10 to 2000 nm or so can be used. Specifically, a homopolymer of styrene or methyl methacrylate or organic microparticles composed of their copolymer can be used.

The lubricating agent is used for the purpose of further improvement of the cleaning property or transfer property. Examples of the lubricating agent include a metal salt of higher fatty acid including zinc, aluminum, copper, magnesium, or calcium salts of stearic acid, zinc, manganese, iron, copper, or magnesium, salts of oleic acid, zinc, copper, magnesium, or calcium salts of palmitic acid, zinc or calcium salts of linoleic acid, and zinc or calcium salts of ricinoleic acid.

The aforementioned external additive may be used either singly or in combination of two or more types.

The addition amount of the external additive is, relative to the toner particles, preferably 0.1 to 10.0% by mass.

As for the method of adding an external additive, an addition method which uses various known mixing devices such as tubular mixer, Henschel mixer, Nauta mixer, or V type mixer can be mentioned.

The volume average particle diameter of the toner for developing electrostatic images according to this embodiment is preferably 3.0 to 8.0 μm, and more preferably 4.0 to 7.5 μm. When the volume average particle diameter of the toner is within the range, toner particles having high adhesion which adhere to a heating member due to flying during fixing and cause fixing off-set are reduced and image quality of half tone is improved due to an increased transfer efficiency, and thus image quality of fine lines or dots is improved. Further, it is also possible to have toner fluidity.

The average particle diameter of the toner can be controlled based on concentration of an aggregation agent or addition amount of a solvent during aggregation and fusion step for producing the toner, and also based on fusion time, or composition of the polyester resin.

The toner for developing electrostatic latent images according to the this embodiment has, from the viewpoint of improving the transfer efficiency, the average circularity preferably 0.920 to 1.000, and more preferably 0.940 to 0.995, in which the average circularity is represented by the following Mathematical Formula 1.

[Mathematical Formula 1]

$$\text{Average circularity} = \text{Peripheral length of circle obtained from equivalent circle diameter}/\text{Peripheral length of projected particle image} \quad \text{Mathematical Formula 1}$$

Meanwhile, the average circularity can be measured by using, for example, an apparatus for measuring average circularity "FPIA-3000" (manufactured by Sysmex).

<Method for Producing Toner for Developing Electrostatic Images>

The method for producing a toner for developing electrostatic images is not particularly limited, and examples thereof include a known method such as a kneading pulverization method, a suspension polymerization method, an emulsifying aggregation method, a melting suspension method, a polyester elongation method, and a dispersion polymerization method.

Among them, from the viewpoint of homogeneity of particle diameter useful for obtaining high image quality and high charging stabilization, control of the shape, and easiness for forming a core-shell structure, the emulsifying aggregation method is preferably employed.

The emulsifying aggregation method is a method in which a dispersion of microparticles of resin which are dispersed by a surface active agent or a dispersion stabilizer (hereinbelow, also referred to as "resin microparticles") is admixed with, if necessary, a dispersion of components constituting toner particles like microparticles of a colorant and aggregated by adding an aggregating agent until the desired toner particle diameter is obtained, fusion among the resin microparticles is performed after or simultaneously with the aggregation, and the shape control is performed to form the toner particles.

Herein, the resin microparticles may be complex particles that are formed of plural layers with two or more layers, which consist of resins with different composition.

The resin microparticles may be produced by, for example, an emulsifying polymerization method, a mini emulsion polymerization method, a phase inversion emulsion method, or the like, or by combining several production methods. When an internal additive is contained in the resin microparticles, it is preferable to use the mini emulsion polymerization method among them.

When the internal additive is contained in the toner particles, the resin microparticles may be prepared to contain the internal additive. Alternatively, it is also possible that a dispersion of the microparticles of the internal additive composed only of separate internal additive is prepared and the resulting microparticles of the internal additive are aggregated at the time of aggregating the resin microparticles.

Further, when the toner particles are constituted to have a core-shell structure, resin microparticles with different composition can be added and aggregated with a time difference during the aggregation.

Subsequently, the preferred embodiment of the method for producing a toner for developing electrostatic images of the present invention is specifically described.

According to one embodiment of the present invention, the method for producing a toner for developing electrostatic images includes a step of for aggregation and fusion which includes mixing a dispersion of microparticles of a first resin and a dispersion of microparticles of a second resin (hereinbelow, also referred to as an "aggregation and fusion step)".

According to one embodiment, the aforementioned production method may include, before the aforementioned aggregation and fusion step, a step for preparing a dispersion of microparticles of a first resin, a step for preparing a dispersion of microparticles of a second resin, a step for preparing a dispersion of microparticles of a releasing agent, and a step for preparing a dispersion of microparticles of a colorant.

Further, according to one embodiment, the production method may include, after the aforementioned aggregation and fusion step, a cooling step, a filtering and washing step, a drying step, or a step for adding an external additive.

[Step for Preparing Dispersion of Microparticles of First Resin]

(1) Preparation of First Resin

The first resin can be obtained by a polycondensation reaction between dicarboxylic acid corresponding to the dicarboxylic acid unit of the first resin and dialcohol corresponding to the dialcohol unit of the first resin as described above. For the polycondensation reaction, the reaction temperature, reaction time, or the like are suitably adjusted to have desired weight average molecular weight.

The polymerization temperature is not particularly limited, but it is preferably 150 to 230° C. Further, although not particularly limited, the polymerization time is preferably 0.5 to 10 hours. Meanwhile, if necessary, the inside of the reaction system may be under reduced pressure during the polymerization.

When the dicarboxylic acid and dialcohol are not dissolved or do not have compatibility at the reaction temperature, they can be dissolved by adding a solvent with high boiling point as a dissolution aid. The polycondensation reaction is performed while removing the dissolution aid solvent by distillation.

For preparation of the first resin, a catalyst may be used, if necessary. Examples of the catalyst include alkali metal compounds such as sodium or lithium; alkaline earth metal compounds such as magnesium or calcium; metal compounds such as aluminum, zinc, manganese, antimony, titanium, tin, zirconium, or germanium; phosphorous acid compounds; phosphoric acid compounds; and amine compounds. Specifically, examples of the tin compound include dibutyl tin oxide, tin octylate, dioctyl tin oxide, and salts thereof. Examples of the titanium compound include titan alkoxide such as tetra normal butyl titanate, tetra(2-ethylhexyl)titanate, tetraisopropyl titanate, tetramethyl titanate, or tetrastearyl titanate; titanium acylate such as polyhydroxy titanium stearate; and titanium chelate such as titanium tetraacetaylacetonate, titanium octylene glycolate, titanium ethylacetoacetate, titanium lactate, or titanium triethoanolaminate. Examples of the germanium compound include germanium dioxide. Further, examples of the aluminum compound include an oxide such as aluminum polyhydroxide and aluminum alkoxide, and tributyl aluminate, trioctyl aluminate, and tristearyl aluminate. Among them tin octylate is preferably used. Meanwhile, the catalyst may be used either singly or in combination of two or more types.

(2) Preparation of Dispersion of Microparticles of First Resin

The step for producing a dispersion of microparticles of the first resin is a step for producing a dispersion of microparticles of the first resin by synthesizing the first resin constituting the toner particles and dispersing the first resin in the form of microparticles in an aqueous medium.

Meanwhile, as described herein, the "aqueous medium" means a medium containing water in an amount of at least 50% by mass, and examples of the component other than water include an organic solvent which is dissolved in water. Examples thereof include methanol, ethanol, isopropanol, butanol, acetone, methyl ethyl ketone, dimethyl formamide, methyl cellosolve, and tetrahydrofuran. Among them, an alcoholic organic solvent such as methanol, ethanol, isopropanol, or butanol, that is, an organic solvent which does not dissolve a resin, is preferably used. Preferably, only water is used as an aqueous medium.

As for the method of dispersing the first resin in an aqueous medium, a method including preparing an oil phase liquid by dissolving or dispersing the first resin in an organic solvent (that is, a dissolving agent), dispersing the oil phase liquid in an aqueous medium by phase inversion emulsification, or the like to form oil droplets having the particle size controlled to a desired diameter, and removing an organic solvent can be mentioned.

The use amount of the aqueous medium is, relative to 100 parts by mass of the first resin, preferably 50 to 2,000 parts by mass, and more preferably 100 to 1,000 parts by mass. By having the use amount of the aqueous medium in the aforementioned range, oil phase liquid in an aqueous medium can be emulsified and dispersed to a desired particle diameter.

The organic solvent (dissolving agent) used for preparation of an oil phase liquid preferably has low boiling point and low solubility in water from the viewpoint of easy removal of oil droplets after formation. Specific examples include methyl acetate, ethyl acetate, methyl ethyl ketone, isopropyl alcohol, methyl isobutyl ketone, toluene, and xylene. It may be used either singly or in combination of two or more types.

The use amount of the organic solvent (dissolving agent) (that is, total use amount when two or more types are used) is preferably 1 to 300 parts by mass, more preferably 10 to 200 parts by mass, and even more preferably 25 to 100 parts by mass relative to 100 parts by mass of the first resin.

It is also possible that ammonia or sodium hydroxide may be added to the oil phase liquid in order to have smooth progress of emulsification by ion separation of carboxy group followed by stable emulsification in an aqueous phase.

The use amount of the aqueous medium is preferably 50 to 2,000 parts by mass, and more preferably 100 to 1,000 parts by mass relative to 100 parts by mass of the oil phase liquid. By having the use amount of the aqueous medium within the range, the oil phase liquid can be emulsified and dispersed in an aqueous medium to have a desired particle diameter.

In an aqueous medium, it is possible that a dispersion stabilizer may be dissolved or, for the purpose of enhancing the dispersion stability of oil droplets, a surface active agent or resin microparticles may be added.

Examples of the dispersion stabilizer include an inorganic compound such as tricalcium phosphate, calcium carbonate, titanium oxide, colloidal silica, or hydroxyapatite. Among them, because it is necessary to remove the dispersion stabilizer from the parent particles of toner obtainable, those soluble in acid or alkali, for example, tricalcium phosphate, are preferably used. Further, from the environmental point of view, those decomposable by an enzyme are preferably used.

Examples of the surface active agent include an anionic surface active agent such as alkylbenzene sulfonate, α-olefin sulfatone, or phosphoric acid ester, a cationic surface active agent of an amine type such as alkyl amine salt, aminoalcohol fatty acid derivative, polyamine fatty acid derivate, or imidazoline or quaternary ammonium type such as alkyltrimethyl ammonium salt, dialkyldimethyl ammonium salt, alkyldiemethylbenzyl ammonium salt, pyridinium salt, alkylisoquinolinium salt, or benzetonium chloride, a non-ionic surface active agent such as fatty acid amide derivative or polyvalent alcohol derivative, and an amphoteric surface active agent such as alanine, dodecyl di(aminoethyl)glycine, di(octylaminoethyl)glycine, or N-alkyl-N,N-dimethyl ammonium betaine. Further, an anionic surface active agent or a cationic surface active agent having a fluoroalkyl group can be also used.

Further, as resin microparticles for improved dispersion stability, those having particle diameter of 0.5 to 3 μm are preferable. Specific examples thereof include microparticles of polymethacryl methyl resin with particle diameter of 1 μm and 3 μm, polystyrene resin microparticles with particle diameter of 0.5 μm and 2 μm, and polystyrene-acrylonitrile resin microparticles with particle diameter of 1 μm.

The emulsifying dispersion of an oil phase liquid can be performed by utilizing mechanical energy, and a disperser for performing the emulsifying dispersion is, although not particularly limited, a low speed shear type disperser, a high speed shear type disperser, a friction type disperser, a high speed jet type disperser, an ultrasonic disperser, and a high pressure impact type disperser altimizer. Specific examples thereof include TK type homomixer (manufactured by Tokushu Kika Kogyo, Co., Ltd.).

The removal of an organic solvent after forming oil droplets can be performed by slowly increasing the temperature of an entire dispersion in which the microparticles of the crystalline polyester resin are dispersed in an aqueous medium under a stirring state, and by performing a process of removing a solvent or the like after having strong stirring in a constant temperature region. Alternatively, it can be removed under reduced pressure by using a device like an evaporator.

The particle diameter of the microparticles of the first resin (that is, oil droplets) in a dispersion of the microparticles of the first resin as prepared above is preferably 60 to 1000 nm and more preferably 80 to 500 nm in terms of volume average particle diameter. Meanwhile, the volume average particle diameter is measured by the method described in Examples. Meanwhile, the volume average particle diameter of oil droplets can be controlled based on the size of mechanical energy which is applied during emulsifying dispersion.

Further, the content of the microparticles of the first resin in a dispersion of the microparticles of the first resin is preferably in the range of 10 to 50% by mass, and more preferably in the range of 15 to 40% by mass. Within the range, broadening of the particle size distribution is suppressed so that the toner characteristics can be improved.

[Step for Preparing Dispersion of Microparticles of Second Resin]

(1) Preparation of Crystalline Segment

The crystalline segment can be obtained by a polycondensation reaction between dicarboxylic acid which corresponds to the dicarboxylic acid unit of the crystalline polyester segment of the second resin (crystalline segment) and dialcohol which corresponds to the dialcohol unit of the crystalline polyester segment of the second resin (crystalline segment). To have desired weight average molecular weight, the reaction temperature, reaction time, or the like are suitably adjusted during the polycondensation.

The reaction temperature, dissolution aid, catalyst, or the like are the same as those for preparation of the first resin.

(2) Preparation of Amorphous Segment

The amorphous segment can be prepared by a known method. For example, when the amorphous segment is obtained by condensation of a polyvalent carboxylic acid component and a polyvalent alcohol component, it can be obtained by a polycondensation reaction between polyvalent carboxylic acid and polyvalent alcohol as described above. To have desired weight average molecular weight, the reaction temperature, reaction time, or the like are suitably adjusted during the polycondensation.

The polymerization temperature is not particularly limited, but it is preferably 80 to 200° C. The polymerization time is not particularly limited, either, but it is preferably 0.5 to 10 hours. Meanwhile, during the polymerization, pressure of the inside of the reaction system can be lowered, if necessary.

(3) Preparation of Second Resin

Preparation of the second resin can be achieved by a polycondensation reaction of the crystalline segment and amorphous segment which have been prepared in the above (1) and (2). To have desired weight average molecular weight, the reaction temperature, reaction time, or the like are suitably adjusted during the polycondensation.

At that time, from the viewpoint of having desirable progress of the polymerization reaction, it is preferable that one of the crystalline segment and amorphous segment be dicarboxylic acid and the other dialcohol. Meanwhile, with regard to the amorphous segment, it can be tricarboxylic acid, trialcohol, monoalcohol dicarboxylic acid, or the like.

The polymerization method is not particularly limited, but it is preferably performed by heating and mixing.

The mixing mass ratio is preferably such that amorphous segment:crystalline segment=1:5 to 100. It is more preferably such that amorphous segment:crystalline segment=10 to 50.

Further, the heating temperature is suitably set to allow the reaction to progress, and although it may vary depending on the amorphous segment and crystalline segment to be used, it is preferably 70 to 150° C., and more preferably 80 to 120° C.

The heating time is suitably set to allow the reaction to progress, and it is preferably 0.5 to 10 hours, and more preferably 0.8 to 5 hours.

(4) Preparation of Dispersion of Microparticles of Second Resin

The dispersion of microparticles of the second resin is prepared by dispersing in an aqueous medium the second resin produced above in the form of microparticles.

As for the method of dispersing the second resin in an aqueous medium, a method including preparing an oil phase liquid by dissolving or dispersing the binder resin in an organic solvent (that is, a dissolving agent), dispersing the oil phase liquid in an aqueous medium by phase inversion emulsification or the like to form oil droplets having particle size controlled to a desired diameter, and removing an organic solvent can be mentioned, similar to the case of dispersing the first resin in an aqueous medium.

[Step for Preparing Dispersion of Microparticles of Releasing Agent]

The step for preparing dispersion of microparticles of a releasing agent is a step which is performed as required when a releasing agent is desirably contained as toner particles. It is a step in which a releasing agent is dispersed in the form of microparticles in an aqueous medium and a dispersion of microparticles of a releasing agent is prepared.

The aqueous medium is as explained above, and for the purpose of enhancing the dispersion stability, a surface active agent, resin microparticles, or the like may be added to an aqueous medium.

Dispersing a releasing agent can be performed by utilizing mechanical energy and examples of a disperser include, as described above, though not particularly limited, a low speed shear type disperser, a high speed shear type disperser, a friction type disperser, a high speed jet type disperser, an ultrasonic disperser, a high pressure impact type disperser altimizer, and a high pressure homogenizer. Specific examples thereof include a Menton Gaulin homogenizer (manufactured by Gaulin).

For dispersing a releasing agent, heating may be performed, if necessary.

The volume average particles diameter of a releasing agent is preferably 10 to 300 nm.

Further, the content of microparticles of a releasing agent in a dispersion of microparticles of a releasing agent is preferably in the range of 10 to 50% by mass, and more preferably in the range of 15 to 40% by mass. When it is within the range, there is an effect of preventing hot off-set or ensuring the release property.

[Step for Preparing Dispersion of Microparticles of Colorant]

The step for preparing dispersion of microparticles of a colorant is a step which is performed as required when a colorant is desirably contained as toner particles. It is a step in which a colorant is dispersed in the form of microparticles in an aqueous medium and a dispersion of microparticles of a colorant is produced.

The aqueous medium is as explained above, and for the purpose of enhancing the dispersion stability, a surface active agent, resin microparticles, or the like may be added to an aqueous medium.

Dispersing a colorant can be performed by utilizing mechanical energy and examples of a disperser include, though not particularly limited, as described above, a low speed shear type disperser, a high speed shear type disperser, a friction type disperser, a high speed jet type disperser, an ultrasonic disperser, and a high pressure impact type disperser altimizer. Specific examples thereof include HJP30006 which is manufactured by Sugino Machine, Ltd.

The volume average particles diameter of microparticles of a colorant is preferably 10 to 300 nm, and more preferably 100 to 200 nm.

Further, the content of the microparticles of a colorant in a dispersion of the microparticles of a colorant is preferably in the range of 10 to 50% by mass, and more preferably in the range of 15 to 40% by mass. When it is within the range, an effect of ensuring color reproducibility is obtained.

[Aggregation and Fusion Step]

The aggregation and fusion step is a step for forming toner particles by adding and mixing a dispersion of microparticles of the first resin, a dispersion of microparticles of the second resin, and if necessary, a dispersion of microparticles of a releasing agent, or a dispersion of microparticles of a colorant, performing gradual aggregation by adjusting pH while maintaining the balance between repulsive force on surface of the microparticles and aggregation force caused by addition of an aggregating agent consisting of an electrolyte, and performing shape control by carrying out fusion among microparticles by heating and stirring simultaneously performing association under control of average particle diameter and particle size distribution. The aggregation and fusion step can be also performed, if necessary, by utilizing mechanical energy or heating means.

For the aggregation step, each dispersion obtained is first mixed with each other to give a mixture solution, which is then heated and aggregated at the temperature that is equal to or lower than the glass transition temperature of the second resin to form aggregated particles. Forming the aggregation particles is achieved by adjusting the pH of the mixture liquid to be acidic. pH is preferably in the range of 2 to 7, more preferably in the range of 2.2 to 6, and even more preferably in the range of 2.4 to 5. At that time, it is also effective to use an aggregating agent.

As for the aggregating agent to be used, a metal complex with valency of two or higher can be preferably used in addition to a surface active agent and a surface active agent with reverse polarity used for a dispersing agent, and inorganic metal salt.

Examples of the inorganic metal salt include metal salts such as calcium chloride, calcium nitrate, barium chloride, magnesium chloride, zinc chloride, aluminum chloride, or aluminum sulfate, and inorganic metal salt polymers such as aluminum polychloride, polyhydroxy aluminum, or calcium polysulfide. Among them, aluminum salts and polymers thereof are particularly preferable. For obtaining a sharper particle diameter distribution, with regard to the valency of the inorganic metal salt, divalent is better than monovalent, trivalent is better than divalent and tetravalent is better than trivalent.

It is also possible to produce a toner having a constitution in which the surface of core aggregation particles is coated with the second resin by further adding the second resin when the desired particle diameter is obtained for the aggregated particles. For further addition, an aggregating agent can be added or pH adjustment is carried out before the further addition.

For the aggregation, the temperature is preferably increased. The heating temperature is preferably in the range of 40 to 100° C., and the temperature increase rate is preferably in the range of 0.1 to 5° C./minute.

Once the aggregated particles have desired particle diameter, the aggregation of various microparticles in the reaction system is terminated (hereinbelow, also referred to as an "aggregation termination step"). The termination of the aggregation is performed by adding an aggregation terminating agent consisting of a basic compound, which can adjust pH to a direction which allows for an escape from pH environment promoting an activity of aggregating microparticles in an aggregation step, in order to suppress the aggregation activity of microparticles in a reaction system. The particle diameter desired for the aggregated particles is not particularly limited, however, the volume average particle diameter is preferably 4.5 to 7.0 μm or so.

During the aggregation termination step, pH of the reaction system is preferably adjusted to 5.0 to 9.0.

Examples of the aggregation terminating agent (that is, basic compound) include ethylenediamine tetraacetic acid (EDTA) and an alkali metal salt thereof such as sodium salt, gluconal, sodium gluconate, potassium citrate, sodium citrate, nitrotriacetate (NTA) salt, GLDA (commercially available L-glutaminic acid N,N-diacetic acid), fumic acid, fulvic acid, maltol, ethyl maltol, pentaacetic acid, tetraacetic acid, known water soluble polymers having both a carboxy group and a hydroxyl group (that is, polymer electrolyte), sodium hydroxide, and potassium hydroxide. During the aggregation termination step, stirring may be performed with reference to the aggregation step.

The fusion step is a step for forming fusion particles by heating the reaction system to pre-determined fusion temperature after undergoing the aforementioned aggregation termination step, and performing fusion of aggregating particles according to fusion of each microparticles which constitute the aggregated particles ensured in the aggregation termination step.

The fusion temperature for the fusion step is preferably equal to or higher than the melting temperature of the first resin. The fusion temperature is preferably 0 to 20° C. higher than the melting temperature of the first resin. The heating time is the time allowing the fusion, and it can be 0.5 to 10 hours or so.

Further, after the aggregation and fusion by mixing a dispersion of the microparticles of the first resin and a dispersion of the microparticles of the second resin as described above, they can be prepared in the core-shell form by mixing with a dispersion of the microparticles of the second resin. Meanwhile, to form a shell, it is also possible to use a dispersion of a known binder resin, for example, an amorphous resin, instead of a dispersion of the microparticles of the second resin to be mixed to form the shell.

For the aggregation and fusion step, a surface active agent may be additionally added to an aqueous medium for stable dispersion of each microparticles in an aggregation system.

As for the surface active agent, various known ones can be used without particular limitation. Preferred examples thereof include an ionic surface active agent including anionic and cationic ones like sulfonates such as sodium dodecylbenzene sulfonate or sodium arylalkyl polyether sulfonate; sulfuric acid esters such as sodium dodecyl sulfate, sodium tetradecyl sulfate, sodium pentadecyl sulfate, or sodium octyl sulfate; fatty acid salts such as sodium oleate, sodium laurate, sodium caprate, sodium caprylate, sodium capronate, potassium stearate, or calcium oleate.

Further, a nonionic surface active agent such as polyethylene oxide, polypropylene oxide, combination of polypropylene oxide and polyethylene oxide, ester of polyethylene glycol and higher fatty acid, alkylphenol polyethylene oxide, an ester of higher fatty acid and polyethylene glycol, an ester of higher fatty acid and polypropylene oxide, or sorbitan ester can be also used.

The aforementioned surface active agent can be used either singly or in combination of two or more types as desired.

The addition ratio (mass ratio) of the microparticles of the second resin/the microparticles of the first resin in the aggregation and fusion step is preferably 0.1 to 20, and more preferably 0.2 to 5. When it is within this range, the toner to be obtained has excellent heat resistance storability and also excellent low temperature fixability.

When another internal additive is added to the toner particles, it is preferable to have a method in which a dispersion of the microparticles of an internal additive, which consists only of an internal additive, is prepared before the aggregation and fusion step, and the dispersion of the microparticles of an internal additive is admixed with the dispersion of microparticles of the first resin and the dispersion of microparticles of the second resin during the aggregation and fusion step.

Further, when core-shell particles are to be produced, they can be formed by having a shelling step in which resin particles for shell (that is, dispersion of microparticles of the second resin) are added to a dispersion of core particles (that is, dispersion of microparticles of the second resin or dispersion of microparticles of the first resin) for aggregation and fusion of the resin particles for shell on a surface of the core particles to form parent toner particles with core-shell structure and a second aging step in which the parent toner particles with a core-shell structure are aged with heat energy and the shape of the parent toner particles with a core-shell structure is adjusted.

[Cooling Step]

The cooling step is generally performed after the aggregation and fusion step. According to the cooling step, by performing cooling after fusion, the fused particles are obtained.

The cooling step preferably includes maintaining for 30 minutes or longer at a temperature which is 5 to 20° C. lower than the melting point of the first resin and then cooling to 0 to 45° C. at a rate faster than 5° C./minute. In other words, the cooling step includes preferably a maintaining step in which it is maintained for 30 minutes or longer at a temperature which is 5 to 20° C. lower than the melting point (hereinbelow, simply referred to as a maintaining step) and a cooling step in which cooling to 0 to 45° C. is performed at a rate faster than 5° C./minute (hereinbelow, simply referred to as a cooling step). According to rapid cooling after maintaining for a predetermined time, a homogenous domain of the first resin or a releasing agent formed during the maintaining step can be maintained, and thus the toner particles with excellent heat resistance storability or releasability can be obtained.

The fused particles obtained by fusion can be prepared as toner particles after undergoing a solid-liquid separation step like filtration, or if necessary, a washing step and drying step.

The upper limit of the maintaining time for the maintaining step is not particularly limited. However, from the viewpoint of the productivity, it is preferably 10 hours or less. More preferably, the maintaining time is 0.5 to 3 hours.

The cooling rate is more preferably 1.0 to 7.0° C./minute.

[Filtering and Washing Step]

According to the filtering and washing step, a filtering treatment in which a dispersion of the obtained toner particles is cooled to give a slurry after cooling and the toner particles are filtered and separated by solid-liquid separation of toner particles from the dispersion of the cooled toner particles by using a solvent like water, and a washing treatment in which adhered materials like a surface active agent are removed from the filtered and separated toner particles (that is, cake-like aggregates) are performed. Specific examples of the solid-liquid separation and washing method include a centrifugal centrifugation, a reduced-pressure filtration method using an aspirator or a nutsch, and a filtration method using a filter press or the like, but not particularly limited thereto. For this filtering and washing step, pH adjustment or pulverization or the like can be suitably performed. Such operations can be also performed repeatedly.

[Drying Step]

According to the drying step, the toner particles after the washing treatment are subjected to a drying treatment. Examples of a dryer used for the drying step include an oven, a spray dryer, a vacuum lyophilizer, a reduced-pressure dryer, a static shelf dryer, a portable shelf dryer, a fluid layer dryer, a rotary type dryer, and a stirring type dryer, but not particularly limited thereto. Meanwhile, the moisture content measured by Karl Fischer coulometric titration method in the toner particles after the drying treatment is preferably 5% by mass or less, and more preferably 2% by mass or less.

Further, when the toner particles after the drying treatment form an aggregate by aggregation due to weak inter-particle attractive forces, the aggregated can be subjected to a de-aggregation treatment. As for a device for a de-aggregation treatment, a mechanical type deaggregation device such as a jet mill, a co-mill, a Henschell mixer, a coffee mill, or a food processor can be used.

[Step for Adding External Additive]

The step for adding an external additive is a step for adding an external additive like a charge controlling agent, various inorganic microparticles, organic microparticles, and a lubricating agent for the purpose of improving the fluidity, charging property, and cleaning property of the toner particles after the drying treatment and it is performed as required. Examples of a device which is used for adding an external additive include various known mixing devices such as tubular mixer, Henschel mixer, Nauta mixer, or V type mixer, or a sample mill. Further, to have the toner particle size distribution within a suitable range, a sieve classification can be performed, if necessary.

According to the production method described above, a toner basically capable of forming a high quality image and also having excellent low temperature fixability, excellent heat resistance off-set property, and excellent mechanical strength can be easily produced with low production load.

<Developing Agent>

It can be considered that the aforementioned toner is used as one-component magnetic toner by containing a magnetic material or as two-component developing agent after mixing with a so-called carrier, or non-magnetic toner can be used by itself. It can be used preferably for any one of those cases.

Examples of the carrier constituting the two-component developing agent which can be used include a metal such as iron, ferrite, and magnetite, and magnetic particles composed of a conventionally known material like an alloy with the aforementioned metal and a metal such as aluminum and lead. It is particularly preferable to use ferrite particles.

As for the carrier, those with volume average particle diameter of 15 to 100 μm are preferable, and those with volume average particle diameter of 25 to 60 μm are preferable.

As for the carrier, those coated with resins or so-called resin dispersion type carriers in which magnetic particles are dispersed in a resin are preferably used. The resin composition for coating is not particularly limited, but examples thereof which can be used include an olefinic resin, a cyclohexyl methacrylate/methyl methacrylate copolymer, a styrene resin, a styrene-acryl resin, a silicone resin, an ester resin, and a fluorine-containing polymeric resin. Further, the resin for constituting the resin dispersion type carrier is not particularly limited, and any known ones can be used. Examples thereof which can be used include an acrylic resin, a styrene-acryl resin, a polyester resin, a fluororesin, and a phenol resin.

<Image Forming Method>

The aforementioned toner can be preferably used for an image forming method which includes a fixing step based on a contact heating mode. As a specific example of the image forming method, an electrostatic latent image which is electrostatically formed by using the aforementioned toner on an image support, for example, is made evident by charging of a developing agent in a developing apparatus by means of friction charged member to obtain a toner image, which is then transferred on a recording medium and according to fixing of the toner image, which has been transferred on a recording medium, on a recording medium by a fixing treatment of contact heating mode, a visible image is obtained. In other words, the toner of the present invention is used for developing electrostatic images.

<Fixing Method>

Preferred examples of the fixing method using the toner of the present invention include a method of so-called contact heating mode. Examples of the contact heating mode include a hot press fixing mode and also hot roll fixing mode and a pressure point heating and fixing mode which involves with fixing by a means of rotating pressing member while including a heating member arranged in a fixed position.

According to the hot roll fixing method, a fixing device constituted with a top roller equipped with a heat source inside a metal cylinder composed of iron or aluminum having the surface coated with a fluororesin and a bottom roller composed of silicone rubber or the like is used.

With regard to the heat source, a line-shaped heater is used, and the surface of the top roller is heated by the heater to the temperature of 120 to 200° C. or so. Pressure is applied between the top roller and bottom roller, and according to deformation of the bottom roller caused by the pressure, so-called nip is formed at the deformation portion. Nip width is 1 to 10 mm, and preferably 1.5 to 7 mm. The linear rate for fixing is preferably 40 to 600 mm/sec. When the nip width is excessively small, homogeneous application of heat cannot be made onto the toner so that heterogeneous fixing may be caused. On the other hand, when the nip width is excessively large, melting of the polyester resin contained in the toner particles is promoted so that fixing off-set may occur.

Hereinabove, the embodiments of the present invention are explained. However, the present invention is not limited to those aspects, and various modifications can be made therefor.

Hereinbelow, the present invention is explained specifically in view of the Examples. However, the invention is not limited to them. Meanwhile, the description like "parts" or "%" is used in the Examples, and unless specifically described otherwise, it indicates "parts by weight" and "% by weight", respectively.

[Measurement Methods]

(1) Average particle diameter and volume average particle diameter of resin microparticles, colorant particles, and others The average particle diameter or volume average particle diameter of the resin microparticles, colorant particles, and others are measured with a laser diffraction particle diameter distribution meter (LA-700, manufactured by Horiba, Ltd.).

(2) Melting temperature (Tm) of the first resin and crystalline segment and glass transition temperature (Tg) of second resin The melting temperature (Tm) of the first resin and crystalline segment and the glass transition temperature (Tg) of the second resin were obtained as follows.

Specifically, the glass transition temperature and melting point were obtained by using "Diamond DSC" (manufactured by Perkin Elmer).

With regard to the measurement order, 3.0 mg of a sample was sealed in an aluminum pan and set in the holder. As a reference, an empty aluminum pan was used. With regard to the measurement condition, heat-cool-heat temperature control was performed at measurement temperature of 0° C. to 200° C., temperature increase rate of 10° C./minute, and temperature decrease rate of 10° C./minute. Then, the analysis was made based on the data from the second heat.

The glass transition temperature was obtained as follows: an extended line of a base line before increase of the first heat absorption peak and a tangent line exhibiting the maximum slope between the increase point of the first peak and the highest peak are drawn and the cross point of the two lines is expressed as a glass transition temperature. Further, the heat absorption peak during the temperature increase step is taken as the melting point.

(3) Weight Average Molecular Weight

The weight average molecular weight was measured as follows. By using the apparatus "HLC-8220" (manufactured by Tosoh Corporation) and columns of "TSK guard column+ TSK gel Super HZ-M3" (manufactured by Tosoh Corporation) at 40° C., tetrahydrofuran (THF) was applied as a carrier solvent at flow rate of 0.2 ml/min. The measurement sample was dissolved in tetrahydrofuan with a condition for dissolving the sample by using an ultrasonic disperser at room temperature for 5 minutes to have concentration of 1 mg/ml. Subsequently, a treatment using a membrane filter with pore size of 0.2 μm was carried out to obtain a sample solution, which was then injected (10 μL) to the apparatus along with the carrier solvent. Then, the detection was made by using a refractive index detector (that is, RI detector), and the molecular weight distribution of the measurement sample was calculated by using a calibration curve which has been obtained by using monodispersed polystyrene reference particles. Meanwhile, 10 points were used for the polystyrene for obtaining the calibration curve.

at which the weight average molecular weight (Mw) is 8100 according to GPC, the first resin P1-1 was synthesized.

The first resin obtained has the melting point (Tm) of 92° C. according to DSC.

SYNTHESIS EXAMPLES 1-2 to 1-13

Synthesis of the First Resins P1-2 to P1-13

Except that the dicarboxylic acid and dialcohol to be used are changed to those described in Table 1 and the reaction is terminated at a point at which the weight average molecular weight (Mw) is the same as that listed in Table 1, the first resins P1-2 to P1-13 were synthesized in the same manner as Synthesis Example 1-1.

The first resins synthesized in Synthesis Example 1-1 to Synthesis Example 1-13 are listed in the following Table 1.

TABLE 1

| | First resin | Dicarboxylic acid unit | Dialcohol unit | 1a | 1b | Mw | Melting point (Tm(° C.)) |
|---|---|---|---|---|---|---|---|
| Synthesis Example 1-1 | P1-1 | Succinic acid | Ethylene glycol | 4 | 2 | 8100 | 92 |
| Synthesis Example 1-2 | P1-2 | Succinic acid | 1,4-Butane diol | 4 | 4 | 9200 | 121 |
| Synthesis Example 1-3 | P1-3 | Adipic acid | 1,6-Hexane diol | 6 | 6 | 12200 | 56 |
| Synthesis Example 1-4 | P1-4 | Adipic acid | 1,6-Hexane diol | 6 | 6 | 5100 | 57 |
| Synthesis Example 1-5 | P1-5 | Adipic acid | 1,6-Hexane diol | 6 | 6 | 98700 | 55 |
| Synthesis Example 1-6 | P1-6 | Suberic acid | 1,6-Hexane diol | 8 | 6 | 51200 | 61 |
| Synthesis Example 1-7 | P1-7 | Sebacic acid | 1,6-Hexane diol | 10 | 6 | 29200 | 66 |
| Synthesis Example 1-8 | P1-8 | Dodecane diacid | 1,9-Nonane diol | 12 | 9 | 11300 | 70 |
| Synthesis Example 1-9 | P1-9 | Dodecane diacid | 1,9-Nonane diol | 12 | 9 | 48400 | 71 |
| Synthesis Example 1-10 | P1-10 | Dodecane diacid | 1,9-Nonane diol | 12 | 9 | 35200 | 70 |
| Synthesis Example 1-11 | P1-11 | Dodecane diacid | 1,12-Dodecane diol | 12 | 12 | 18300 | 85 |
| Synthesis Example 1-12 | P1-12 | Adipic acid | 1,6-Hexane diol | 6 | 6 | 4300 | 56 |
| Synthesis Example 1-13 | P1-13 | Adipic acid | 1,6-Hexane diol | 6 | 6 | 109000 | 57 |

SYNTHESIS EXAMPLE 1-1

Synthesis of the First Resin P1-1
Succinic acid: 50% by mol
Ethylene glycol: 50% by molF To a reaction vessel equipped with a stirrer, a thermometer, a condenser, and an inlet for introducing nitrogen gas were added the above monomer components. Subsequently, the reaction vessel were flushed with dry nitrogen gas, and added with 0.25 parts by mass of titanium tetrabutoxide (reagent) relative to 100 parts by mass of the monomer components. Under nitrogen gas stream, the reaction was allowed to occur under stirring for 3 hours at 170° C., the temperature was further increased to 210° C. over 1 hour, pressure of the inside of the reaction vessel was lowered to 3 kPa, and the reaction was allowed to occur under reduced pressure and stirring. By terminating the reaction at the point

SYNTHESIS EXAMPLE 2-1

Synthesis of the Second Resin P2-1

Each of the crystalline segment and amorphous segment was produced, and then the second resin was synthesized by using them.

(1) Preparation of Crystalline Segment
Succinic acid: 53% by mol
Ethylene glycol: 47% by mol.

To a reaction vessel equipped with a stirrer, a thermometer, a condenser, and an inlet for introducing nitrogen gas, the above monomer components were added. Subsequently, the reaction vessel were flushed with dry nitrogen gas, and added with 0.25 parts by mass of titanium tetrabutoxide (reagent) relative to 100 parts by mass of the monomer components. Under nitrogen gas stream, the reaction was allowed to occur under stirring for 3 hours at 170° C., the temperature was further increased to 210° C. over 1 hour, pressure of the inside of the reaction vessel was lowered to 3 kPa, and the reaction was allowed to occur for 5 hours under reduced pressure and stirring. After removing the reduced pressure, 3% by mol of 1-hexanol was added to the reaction vessel. Thereafter, the reaction was again allowed to occur for 3 hours at 170° C. under nitrogen gas stream and stirring, and the temperature was increased again to 210° C. over 1 hour, pressure of the inside of the reaction vessel was lowered to 3 kPa, and the reaction was allowed to occur under reduced pressure and stirring. By terminating the reaction at the point at which the weight average molecular weight (Mw) is 250 according to GPC, the crystalline segment (that is, crystalline polyester segment) was prepared.

The melting point (Tm) of the obtained crystalline polyester segment was 93° C. according to DSC. Further, from the viewpoint of using succinic acid in an excessive amount, it is generally believed that both ends of the obtained crystalline polyester segment are carboxylic acid.

(2) Preparation of Amorphous Segment

Bisphenol A ethylene oxide 2.2 mol adduct: 10% by mol
Bisphenol A propylene oxide 2.2 mol adduct: 40% by mol
Terephthalic acid: 2% by mol
Fumaric acid: 15% by mol
Glycerin: 13% by mol To a reaction vessel equipped with a stirrer, a thermometer, a condenser, and an inlet for introducing nitrogen gas, bisphenol A ethylene oxide 2.2 mol adduct, bisphenol A propylene oxide 2.2 mol adduct, and terephthalic acid were added. Subsequently, tin dioctanoic acid was added thereto in an amount of 0.25 parts by mass relative to 100 parts by mass of the entire monomer components. Under nitrogen gas stream, the reaction was allowed to occur under stirring for 6 hours at 235° C., the temperature was lowered to 200° C., and fumaric acid and glycerin were added. After the reaction for 1 hour at 200° C. under stirring, the amorphous segment was prepared.

(3) Preparation of the Second Resin P2-1

After the reaction of above (2), the crystalline polyester segment which has been prepared in the above (1) was added in an amount of 80 parts by mass relative to 100 parts by mass of the monomer components used in the above (2). After the reaction for 1 hour, the temperature was further increased to 220° C. over 4 hours, and the reaction was allowed to occur under stirring at pressure of 10 kPa. By terminating the reaction at the point at which the weight average molecular weight (Mw) is 15200 according to GPC, the second resin P2-1, which is transparent, pale yellow, was produced.

SYNTHESIS EXAMPLES 2-2 to 2-17

Synthesis of the Second Resins 2-2 to 2-17

Except that the dicarboxylic acid and dialcohol to be used are changed to those described in Table 2 and the reaction is terminated at a point at which the weight average molecular weight (Mw) is the same as that listed in Table 2, the second resins P2-2 to P2-17 were synthesized in the same manner as Synthesis Example 2-1.

The second resins synthesized in Synthesis Example 2-1 to Synthesis Example 2-17 are listed in the following Table 2.

TABLE 2

| | Second resin | Crystalline polyester segment | | | | | | |
| --- | --- | --- | --- | --- | --- | --- | --- | --- |
| | | Dicarboxylic acid unit | Dialcohol unit | 2a | 2b | Melting point (Tm(° C.)) | Mw | Total Mw |
| Synthesis Example 2-1 | P2-1 | Succinic acid | Ethylene glycol | 4 | 2 | 93 | 250 | 15200 |
| Synthesis Example 2-2 | P2-2 | Succinic acid | 1,4-Butane diol | 4 | 4 | 122 | 400 | 18300 |
| Synthesis Example 2-3 | P2-3 | Succinic acid | 1,4-Butane diol | 4 | 4 | 121 | 3000 | 15100 |
| Synthesis Example 2-4 | P2-4 | Adipic acid | 1,4-Butane diol | 6 | 4 | 48 | 1100 | 17200 |
| Synthesis Example 2-5 | P2-5 | Adipic acid | 1,6-Hexane diol | 6 | 6 | 56 | 1200 | 17600 |
| Synthesis Example 2-6 | P2-6 | Adipic acid | 1,6-Hexane diol | 6 | 6 | 55 | 2200 | 13800 |
| Synthesis Example 2-7 | P2-7 | Sebacic acid | 1,6-Hexane diol | 10 | 6 | 66 | 1500 | 28700 |
| Synthesis Example 2-8 | P2-8 | Sebacic acid | 1,6-Hexane diol | 10 | 6 | 66 | 1500 | 57200 |
| Synthesis Example 2-9 | P2-9 | Dodecane diacid | 1,9-Nonane diol | 12 | 9 | 71 | 1200 | 16700 |
| Synthesis Example 2-10 | P2-10 | Dodecane diacid | 1,9-Nonane diol | 12 | 9 | 71 | 1200 | 5200 |
| Synthesis Example 2-11 | P2-11 | Dodecane diacid | 1,9-Nonane diol | 12 | 9 | 71 | 1200 | 11000 |
| Synthesis Example 2-12 | P2-12 | Dodecane diacid | 1,9-Nonane diol | 12 | 9 | 71 | 1200 | 29300 |
| Synthesis Example 2-13 | P2-13 | Dodecane diacid | 1,12-Dodecane diol | 12 | 12 | 85 | 2700 | 21500 |
| Synthesis Example 2-14 | P2-14 | Succinic acid | Ethylene glycol | 4 | 2 | 92 | 190 | 18200 |
| Synthesis Example 2-15 | P2-15 | Succinic acid | Ethylene glycol | 4 | 2 | 92 | 3500 | 18100 |
| Synthesis Example 2-16 | P2-16 | Dodecane diacid | 1,9-Nonane diol | 12 | 9 | 72 | 1200 | 4700 |
| Synthesis Example 2-17 | P2-17 | Dodecane diacid | 1,9-Nonane diol | 12 | 9 | 71 | 1200 | 61000 |

EXAMPLE 1

Toner was produced by an emulsifying aggregation method.

(Step for Producing Dispersion of Microparticles of First Resin)

To a 3 liter reaction tank having a condenser, a thermometer, a water dropping device, and a jacket with anchor wings (BJ-30N, manufactured by Tokyo Rika Kikai Co., Ltd.), 300 parts by mass of the first resin P1-1 which has been synthesized in Synthesis Example 1-1, 160 parts by mass of methyl ethyl ketone (solvent), and 100 parts by mass of isopropyl alcohol (solvent) were added and mixed under stirring at 100 rpm while maintaining them at 70° C. in a water circulation type incubator to dissolve the first resin P1-1.

After that, the stirring revolution number and the water circulation type incubator were set at 150 rpm and 66° C., respectively, 17 parts by mass of 10% by mass ammonia water (reagent) were added over 10 minutes. Subsequently, ion exchange water heated to 66° C. was added dropwise at rate of 7 parts by mass/minute in the total amount of 900 parts by mass to cause phase inversion. As a result, an emulsified solution was obtained.

Immediately thereafter, 800 parts by mass of the obtained emulsified solution and 700 parts by mass of ion exchange water were added to a 2 liter branched flask and set onto an evaporator having a vacuum control unit via a trapping ball (manufactured by Tokyo Rika Kikai Co., Ltd.). The branched flask was rotated and heated in a hot water bath at 60° C. The pressure was reduced to 7 kPa to remove the solvent while being careful not to have bumping. When the amount of recovered solvent is 1100 parts by mass, the pressure was increased to normal pressure and the branched flask was cooled by water to obtain dispersion. There was no solvent odor from the obtained dispersion. Further, the volume average particle diameter D50v of the resin particles in the dispersion was 130 nm.

Finally, the solid matter concentration was adjusted to 20% by mass by adding ion exchange water to obtain a dispersion of the microparticles of the first resin.

(Step for Producing Dispersion of Microparticles of Second Resin)

To a 3 liter reaction tank having a condenser, a thermometer, a water dropping device, and a jacket with anchor wings (BJ-30N, manufactured by Tokyo Rika Kikai Co., Ltd.), a mixed solvent of 160 parts by mass of ethyl acetate and 100 parts by mass of isopropyl alcohol was added, and then 300 parts by mass of the second resin P2-1 which has been synthesized in Synthesis Example 2-1 were added thereto and mixed under stirring at 150 rpm by using a three-one motor while maintaining them at 40° C. in a water circulation type incubator to dissolve the second resin P2-1. As a result, an oil phase was obtained.

To the stirred oil phase were added 14 parts by mass of 10% by mass ammonia water over 5 minutes. Subsequently, it was mixed for 10 minutes and ion exchange water was further added dropwise thereto at rate of 7 parts by mass/minute in the total amount of 900 parts by mass to cause phase inversion. As a result, an emulsified solution was obtained.

Immediately thereafter, 800 parts by mass of the obtained emulsified solution and 700 parts by mass of ion exchange water were added to a 2 liter branched flask and set onto an evaporator having a vacuum control unit via a trapping ball (manufactured by Tokyo Rika Kikai Co., Ltd.). The branched flask was rotated and heated in a hot water bath at 60° C. The pressure was reduced to 7 kPa to remove the solvent while being careful not to have bumping. When the amount of recovered solvent is 1100 parts by mass, the pressure was returned to normal pressure and the branched flask was cooled by water to obtain dispersion. There was no solvent odor from the obtained dispersion. Further, the volume average particle diameter D50v of the resin particles in the dispersion was 130 nm.

Finally, the solid matter concentration was adjusted to 20% by mass by adding ion exchange water to obtain a dispersion of the microparticles of the second resin.

(Step for Preparing Dispersion of Microparticles of Releasing Agent)

Hydrocarbon based wax (trade name: FNP0090, manufactured by NIPPON SEIRO CO., LTD., melting temperature Tw=90.2° C.): 270 parts by mass Anionic surface active agent (NEOGEN RK, manufactured by Daiichi Kogyo Seiyaku Co., Ltd., amount of effective component: 60% by mass): 13.5 parts by mass (3.0% by mass in terms of effective component relative to a releasing agent)

Ion exchange water: 21.6 parts by mass.

The above components were admixed with one another and the releasing agent was dissolved at internal liquid temperature of 120° C. by using a pressure ejection type homogenizer (Gaulin homogenizer manufactured by Gaulin). They were subjected to a dispersion treatment for 120 minutes at dispersion pressure of 5 MPa and subsequently for 360 minutes at 40 MPa followed by cooling to prepare dispersion. At that time, the volume average particle diameter D50v of the particles in the obtained dispersion was 225 nm.

After that, the solid matter concentration was adjusted to 20.0% by mass by adding ion exchange water to obtain a dispersion of the microparticles of the releasing agent.

(Step for Preparing Dispersion of Microparticles of Colorant)

Cyan pigment (C. I. Pigment Blue 15:3): 200 parts by mass

Anionic surface active agent (NEOGEN SC, manufactured by Daiichi Kogyo Seiyaku Co., Ltd.): 33 parts by mass (amount of effective component: 60% by mass, 10% by mass relative to a colorant)

Ion exchange water: 750 parts by mass.

To a stainless vessel having a size in which the liquid height after adding the entire components above measures up to ⅓ of the height of the vessel, 280 parts by mass of the ion exchange water and the anionic surface active agent were added, and the surface active agent was fully dissolved by heating to the temperature of 40° C. Subsequently, it was cooled to 25° C., added with the entire remaining cyan pigment, and stirred and fully deaerated by using a stirrer until there is no unwetted pigment.

After the deaeration, the remaining ion exchange water was added. After dispersing for 10 minutes at 5000 revolutions by using a homogenizer (ULTRA-TURRAX T50 manufactured by IKA), it was stirred overnight by using a stirrer followed by deaeration. After the deaeration, it was dispersed using the homogenizer again at 6000 revolutions for 10 minutes followed by stirring overnight with a stirrer for deaeration. Subsequently, the dispersion was dispersed at pressure of 240 MPa by using a high pressure impact type disperser altimizer (HJP30006 manufactured by Sugino Machine, Ltd) to obtain a dispersion. Meanwhile, the dispersion was performed for substantial 25 passes when calculated in terms of total injection amount and processing capability of the device.

The obtained dispersion was allowed to stand for 72 hours to remove the precipitates. By adding ion exchange water, the solid matter concentration was adjusted to 20% by mass to obtain a dispersion of the microparticles of the colorant.

Meanwhile, the volume average particle diameter D50V of the particles in the obtained dispersion of microparticles of a colorant was 165 nm and coarse powder of 250 nm or higher was not observed. At that time, as a volume average particle diameter D50V, the average of three measurement values except the maximum and minimum values from five measurements obtained by micro track was used.

(Aggregation and Fusion Step)

Dispersion of microparticles of the first resin: 70 parts by mass

Dispersion of microparticles of the second resin: 700 parts by mass

Dispersion of microparticles of a releasing agent: 98 parts by mass

Dispersion of microparticles of a colorant: 35 parts by mass

Ion exchange water: 300 parts by mass

Anionic surface active agent (Dowfax 2A1 manufactured by Dow Chemical Company): 6.5 parts by mass.

The above components were added to a 3 liter reaction vessel equipped with a thermometer, a pH meter, and a stirrer, and further added with 0.3 M nitric acid at the temperature of 25° C. to adjust the pH to 3.0. Subsequently, 130 parts by mass of an aqueous solution of aluminum sulfate were added while dispersing it at 5000 rpm by using a homogenizer (ULTRA-TURRAX T50 manufactured by IKA Japan) followed by dispersion for 6 minutes.

Meanwhile, the aqueous solution of aluminum sulfate was prepared by adding 35 parts by mass of aluminum sulfate powder (manufactured by ASADA Chemical Co., Ltd.: 17% aluminum sulfate) and 1965 parts by mass of ion exchange water to a 2 liter vessel and stirring and mixing them until the precipitates disappear at 30° C.

After that, the reaction vessel was added with a stirrer and a mantle heater and, while adjusting the revolution number of the stirrer such that the slurry is sufficiently stirred, the temperature was increased at 0.2° C./minute until the temperature of 40° C. and 0.05° C./minute after the temperature is over 40° C. At every 10 minutes, the particle size was measured by using Multi Sizer II (aperture diameter of 50 μm, manufactured by Beckman Coulter Inc.). When the volume average particle diameter is 5.0 μm, pH was adjusted to 9.0 by using 4% by mass aqueous solution of sodium hydroxide. After that, with the same control to have pH of 9.0 at every 5° C., the temperature was increased to 90° C. at the temperature increase rate of 1° C./minute and maintained at 90° C. At every 15 minutes, the particle shape and surface property were measured by using an optical microscope and a scanning electron microscope (FE-SEM). As a result, the joining of the particles was observed at the hour of 2.0. Thus, the vessel was cooled to 57° C. and maintained for 2 hours. It was then cooled to 30° C. over 5 minutes.

The slurry after the cooling was passed through a nylon mesh with sieve size of 15 μm to remove coarse particles. To the toner slurry passed through the mesh, nitric acid was added to adjust the pH to 6.0 followed by filtration under reduced pressure using an aspirator. The toner left on the filter paper was finely crushed as much as possible by hands, added to ion exchange water 10 times the amount of the toner amount at the temperature of 30° C. After stirring and mixing for 30 minutes and filtering again under reduced pressure using an aspirator, the electric conductivity of the filtrate was measured. This process was repeated until the electric conductivity of the filtrate is 10 μS/cm or less to wash the toner.

The washed toner was finely crushed by using a wet and dry type granulator (co-mill) followed by vacuum drying for 36 hours in an oven at 35° C. to obtain the toner particles. To 100 parts by mass of the obtained toner particles, 1.0 part by mass of hydrophobic silica (RY50 manufactured by Nippon Aerosil Co., Ltd.) was added and mixed and blended for 30 seconds at 13000 rpm by using a sample mill. After that, according to a sieving using a vibrating sieve with sieve size of 45 μm, a cyan toner (toner for developing electrostatic latent images) was obtained.

The obtained cyan toner had average volume particle diameter D50v of 6.0 μm and shape coefficient SF 1 of 0.960 (FPIA-3000 manufactured by Sysmex). Meanwhile, as a result of SEM mage observation of the toner, it was observed that a smooth surface was provided without a problem like protrusion of a releasing agent or peeling of a surface layer.

Examples 2 to 15 and Comparative Examples 1 to 10

Except that the first resin and the second resin to be used are changed to those described in Table 3, the toner was produced in the same manner as Example 1.

Toners produced in Examples 1 to 15 and Comparative Examples 1 to 10 are listed in Table 3.

TABLE 3

|  | First resin | Second resin | |1a-2a| | |1b-2b| |
| --- | --- | --- | --- | --- |
| Example 1 | P1-1 | P2-1 | 0 | 0 |
| Example 2 | P1-2 | P2-2 | 0 | 0 |
| Example 3 | P1-2 | P2-3 | 0 | 0 |
| Example 4 | P1-3 | P2-4 | 0 | 2 |
| Example 5 | P1-4 | P2-5 | 0 | 0 |
| Example 6 | P1-3 | P2-5 | 0 | 0 |
| Example 7 | P1-5 | P2-6 | 0 | 0 |
| Example 8 | P1-6 | P2-7 | 2 | 0 |
| Example 9 | P1-7 | P2-8 | 0 | 0 |
| Example 10 | P1-8 | P2-9 | 0 | 0 |
| Example 11 | P1-9 | P2-9 | 0 | 0 |
| Example 12 | P1-10 | P2-10 | 0 | 0 |
| Example 13 | P1-10 | P2-11 | 0 | 0 |
| Example 14 | P1-10 | P2-12 | 0 | 0 |
| Example 15 | P1-11 | P2-13 | 0 | 0 |
| Comparative Example 1 | P1-3 | P2-1 | 2 | 4 |
| Comparative Example 2 | P1-1 | P2-6 | 2 | 4 |
| Comparative Example 3 | P1-10 | P2-6 | 6 | 3 |
| Comparative Example 4 | P1-11 | P2-9 | 0 | 3 |
| Comparative Example 5 | P1-12 | P2-6 | 0 | 0 |
| Comparative Example 6 | P1-13 | P2-6 | 0 | 0 |
| Comparative Example 7 | P1-1 | P2-14 | 0 | 0 |
| Comparative Example 8 | P1-1 | P2-15 | 0 | 0 |
| Comparative Example 9 | P1-10 | P2-16 | 0 | 0 |
| Comparative Example 10 | P1-10 | P2-17 | 0 | 0 |

[Evaluation of Performances]

An evaluation of various performances was performed by using the toner for developing electrostatic latent images that are produced in Examples 1 to 15 and Comparative Examples 1 to 10.

First, the toner for evaluation which is used for the performance evaluation was produced.

To 100 parts by mass of the toner, 0.6 part by mass of hydrophobic silica (number average primary particle diameter=12 nm, hydrophobicity degree=68) and 1.0 part by mass of hydrophobic titanium oxide (number average primary particle diameter=20 nm, hydrophobicity degree=63) were added and mixed for 20 minutes at 32° C. by using a "Henschel mixer" (manufactured by Mitsui Miike Machinery) at rotation wing speed of 35 mm/sec followed by removing coarse particles using a sieve with sieve size of 45 µm, and thus a treatment of adding an external additive is performed. Accordingly, a toner for evaluation was produced.

(Evaluation of Low Temperature Fixability)

The toner for evaluation was admixed with 38 µm ferrite carrier coated with an acrylic resin to have toner concentration of 7.5% by weight and used for the evaluation.

The fixing device of the copying machine "bizhub PRO C6501" (manufactured by Konica Minolta), which has been modified such that the surface temperature of the heating roller varies within the range of 120 to 200° C., was used and the fixing test for fixing a solid image with toner adhesion amount of 10 mg/cm² on a high quality paper of A4 size under atmospheric temperature and atmospheric humidity environment (temperature of 20° C. and humidity of 50% RH) was repeated until 210° C. while the fixing temperature was modified to have an increase from 120° C. at pitch of 5° C.

Among the fixing tests not visually observed with any image defect caused by off-set, the fixing temperature of the fixing test relating to the lowest fixing temperature was measured as the minimum fixing temperature and the highest temperature was measured as the maximum fixing temperature. Meanwhile, when the minimum fixing temperature is equal to or lower than 150° C. and the maximum fixing temperature is equal to or higher than 185° C., the toner can be found to be suitable for practical use.

The obtained results are listed in the following Table 4.

(Evaluation of Heat Resistance Storability)

0.5 g of the toner for evaluation was collected in a 10 mL glass bottle with internal diameter of 21 mm and, after sealing with a cap, it was shaken 600 times at room temperature using Tap Denser KYT-2000 (manufactured by Seishin Enterprise Co., Ltd.). Then, it was kept for 2 hours under an environment with temperature of 55° C. and humidity of 35% RH with the cap open. Subsequently, the toner aggregate was carefully applied on a 48 mesh sieve (sieve size of 350 µm) so as not to de-aggregate the aggregate of the toner, and then set on a powder tester (manufactured by Hosokawa Micron Ltd.) followed by fixing with a pressing bar and a knob nut. After adjusting the vibration strength to have a transfer width of 1 mm and applying vibration for 10 seconds, residual toner amount on the sieve was measured, and the toner aggregation rate was calculated according to the following equation. The evaluation was made accordingly.

Toner aggregation rate (% by mass)={Residual toner amount (g)/0.5 (g)}×100  [Mathematical Formula 2]

Meanwhile, when the toner aggregation rate is less than 15% by mass, it was determined "excellent". When it is equal to or more than 15% by mass and less than or equal to 20% by mass, it was determined "good". When it is more than 20% by mass, it was determined "poor".

The obtained results are listed in the following Table 4.

TABLE 4

| | Fixability | | |
|---|---|---|---|
| | Minimum fixing temperature | Maximum fixing temperature | Heat resistance storability |
| Example 1 | 130 | 190 | 18 |
| Example 2 | 135 | 195 | 17 |
| Example 3 | 145 | 190 | 18 |
| Example 4 | 125 | 185 | 19 |
| Example 5 | 125 | 190 | 19 |
| Example 6 | 135 | 195 | 18 |
| Example 7 | 145 | 190 | 17 |
| Example 8 | 130 | 210 | 20 |
| Example 9 | 150 | 210< | 15 |
| Example 10 | 135 | 190 | 16 |
| Example 11 | 140 | 195 | 15 |
| Example 12 | 125 | 185 | 18 |
| Example 13 | 135 | 195 | 14 |
| Example 14 | 130 | 200 | 12 |
| Example 15 | 135 | 185 | 13 |
| Comparative Example 1 | 135 | 185 | 79 |
| Comparative Example 2 | 130 | 180 | 82 |
| Comparative Example 3 | 130 | 175 | 96 |
| Comparative Example 4 | 135 | 180 | 78 |
| Comparative Example 5 | 125 | 175 | 80 |
| Comparative Example 6 | 155 | 200 | 51 |
| Comparative Example 7 | 140 | 180 | 78 |
| Comparative Example 8 | 155 | 200 | 25 |
| Comparative Example 9 | 125 | 165 | 76 |
| Comparative Example 10 | 165 | 210< | 22 |

As it is clear from the results of Table 4, the toner of Examples 1 to 15 has excellent low temperature fixability and heat resistance storability.

Meanwhile, the toners of Comparative Examples 1 to 4 have poor heat resistance storability. The reasons is believed to be as follows: the absolute value of a difference between the carbon number (1a) of the dicarbon unit in the first resin and the carbon number (2a) of the dicarboxylic acid unit in the crystalline polyester segment of the second resin, that is, (|1a-2a|), and the absolute value of a difference between the carbon number (1b) of the dialcohol unit in the first resin and the carbon number (2b) of the dialcohol unit of the crystalline polyester segment in the second resin, that is, (|1b-2|), are large, it was impossible to disperse and maintain the first resin within the second resin.

Further, from the results of Comparative Examples 5 and 6, it was found that poor toner performance is obtained when the weight average molecular weight of the first resin is excessively low or excessively high. Specifically, when the weight average molecular weight of the first resin is excessively low (Comparative Example 5), the compatibility cannot be inhibited so that not only the heat resistance storability is deteriorated but also the maximum fixing temperature is lowered due to an easy occurrence of high temperature off-set. On the other hand, when the weight average molecular weight of the first resin is excessively high (Comparative Example 6), sufficient low temperature fixability was not obtained.

Further, from the results of Comparative Examples 7 and 8, it was found the poor toner performance is obtained when the weight average molecular weight of the crystalline polyester segment of the second resin is excessively low or excessively high. Specifically, when the weight average molecular weight of the crystalline polyester segment of the second resin is excessively low (Comparative Example 7), the area in which each crystalline polyester segment interacts with first resin is small so that the heat resistance storability is lowered. On the other hand, when the weight average molecular weight of the crystalline polyester segment of the second resin is excessively high (Comparative Example 8), sufficient low temperature fixability was not obtained.

Further, from the results of Comparative Examples 9 and 10, it was found the poor toner performance is obtained when the weight average molecular weight of the second resin is excessively low or excessively high. Specifically, when the weight average molecular weight of the second resin is excessively low (Comparative Example 9), it becomes easier to have an occurrence of hot off-set so that the maximum fixing temperature is lowered. On the other hand, when the weight average molecular weight of the second resin is excessively high (Comparative Example 10), sufficient low temperature fixability was not obtained, yielding the higher minimum fixing temperature.

Meanwhile, this application is based on Japanese Patent Application No. 2013-209419 which has been filed on Oct. 4, 2013, and the contents of which are entirely incorporated herein by reference.

What is claimed is:

1. A toner for developing electrostatic images comprising a binder resin consisting of a first resin and a second resin, wherein
    the first resin is a crystalline polyester resin consisting of a polyester structure formed from a dicarboxylic acid and a dialcohol, wherein the dicarboxylic acid is a linear or branched aliphatic dicarboxylic acid, and the dialcohl is an aliphatic dialcohol,
    a carbon number (1a) of the dicarboxylic acid in the first resin and a carbon number (1b) of the dialcohol in the first resin have relationships of $4 \leq 1a \leq 12$ and $2 \leq 1b \leq 12$,
    the second resin is a polyester resin consisting of a crystalline segment and an amorphous segment,
    the crystalline segment of the second resin is a crystalline polyester segment consisting of a polyester structure formed from a dicarboxylic acid and a dialcohol, wherein the dicarboxylic acid is a linear or branched aliphatic dicarboxylic acid, and the dialcohl is an aliphatic dialcohol,
    a carbon number (2a) of the dicarboxylic acid and a carbon number (2b) of the dialcohol in the crystalline polyester segment of the second resin have relationships of $4 \leq 2a \leq 12$ and $2 \leq 2b \leq 12$ and also satisfy the relationships of $0 \leq |1a-2a| \leq 2$ and $0 \leq |1b-2b| \leq 2$,
    a weight average molecular weight of the first resin is 5000 to 100000,
    a weight average molecular weight of the second resin is 5000 to 60000, and
    a weight average molecular weight of the crystalline segment in the second resin is 200 to 3000.

2. The toner for developing electrostatic images as claimed in claim 1,
    wherein the weight average molecular weight of the first resin is 10000 to 50000,
    the weight average molecular weight of the second resin is 10000 to 50000, and
    the weight average molecular weight of the crystalline segment in the second resin is 500 to 3000.

3. The toner for developing electrostatic images as claimed in claim 1,
    wherein a melting point (Tm) of the first resin is equal to or higher than 40° C. but lower than 90° C.

4. The toner for developing electrostatic images as claimed in claim 1,
    wherein the dicarboxylic acid of the first resin is the aliphatic linear dicarboxylic acid.

5. The toner for developing electrostatic images as claimed in claim 1,
    wherein the dialcohol of the first resin is an aliphatic linear dialcohol.

6. The toner for developing electrostatic images as claimed in claim 3,
    wherein the melting point (Tm) of the first resin is equal to or higher than 55° C. but lower than 80° C.

7. The toner for developing electrostatic images as claimed in claim 1,
    wherein a content of the first resin is 1 to 40 parts by mass relative to the entire toner.

8. The toner for developing electrostatic images as claimed in claim 7,
    wherein a content of the first resin is 5 to 20 parts by mass relative to the entire toner.

9. The toner for developing electrostatic images as claimed in claim 1,
    wherein the amorphous segment is an amorphous polyester obtained by condensation of a polyvalent carboxylic acid component and a polyvalent alcohol component.

10. The toner for developing electrostatic images as claimed in claim 1,
    wherein the carbon number (1a) and the carbon number (2a) have a relationship of $|1a-2a|=0$.

11. The toner for developing electrostatic images as claimed in claim 1,
    wherein the carbon number (1b) and the carbon number (2b) have a relationship of $|1b-2b|=0$.

* * * * *